April 4, 1939.   E. L. WELCH   2,152,938
VEHICLE BANKING MECHANISM
Filed July 11, 1936   2 Sheets-Sheet 1

Inventor
Edward L. Welch
By Carl Miller
Attorney

April 4, 1939.  E. L. WELCH  2,152,938
VEHICLE BANKING MECHANISM
Filed July 11, 1936  2 Sheets-Sheet 2
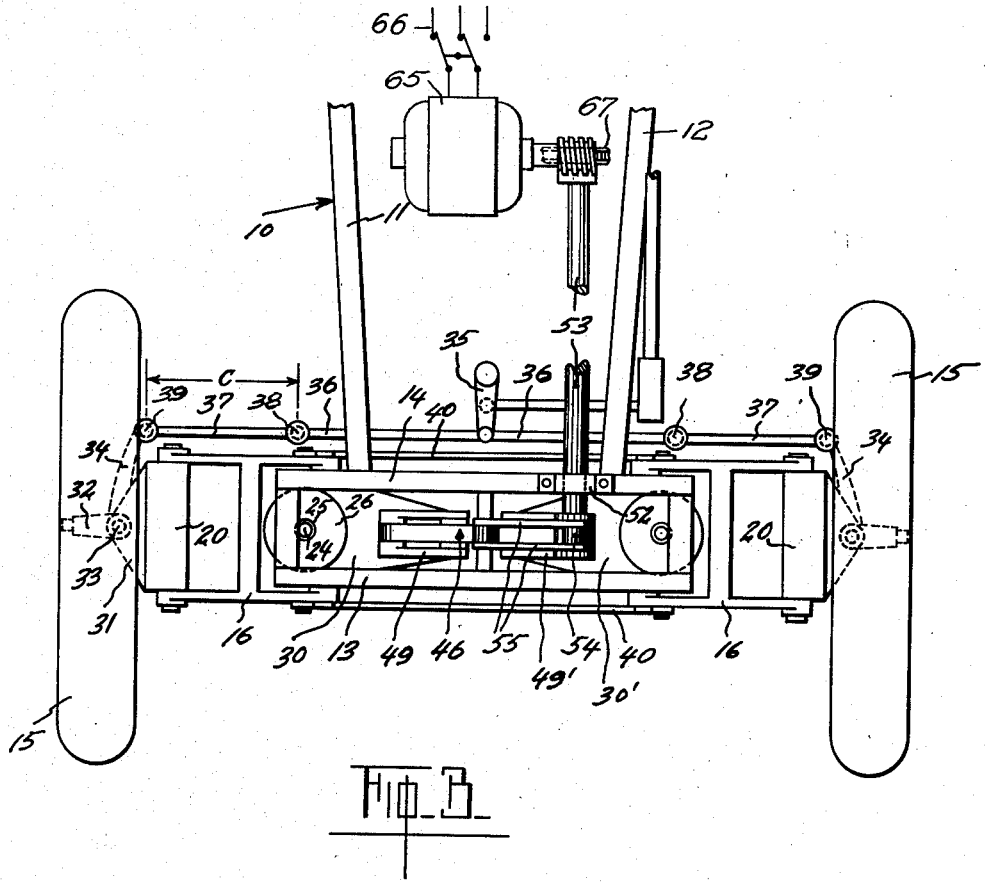
Inventor
Edward L. Welch
By Carl Miller
Attorney Patented Apr. 4, 1939

2,152,938

UNITED STATES PATENT OFFICE 2,152,938

VEHICLE BANKING MECHANISM

Edward L. Welch, Norwood, Mass.

Application July 11, 1936, Serial No. 90,123

8 Claims. (Cl. 280—112)

This invention relates to a motor vehicle wheel mounting structure and more particularly to a wheel canting and body tilting mechanism.

The principal object of this invention is to provide in an independent suspension for the wheels of a motor vehicle, a power operated link and lever mechanism operatively connected to a suspension arm of the wheels whereby to cause the entire vehicle to bank as it makes a turn on a flat curve so as to throw the center of gravity of the vehicle nearer to the inside of the curve. In a vehicle provided with the mechanism of my invention the margin of safety is greatly enhanced as it is possible to turn corners with greater speed, skidding is obviated, wear on the front tires is reduced, lateral strains and thrusts on the chassis parts are greatly minimized, a saving in the power to propel the vehicle is effected and the vehicle is rendered less apt to turn over.

Figure 1:
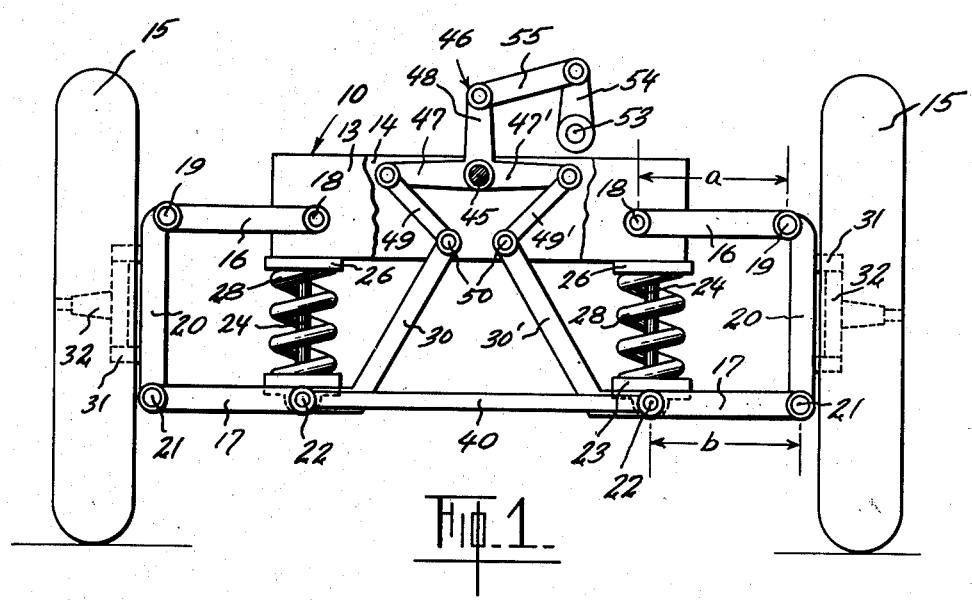
Figure 2:
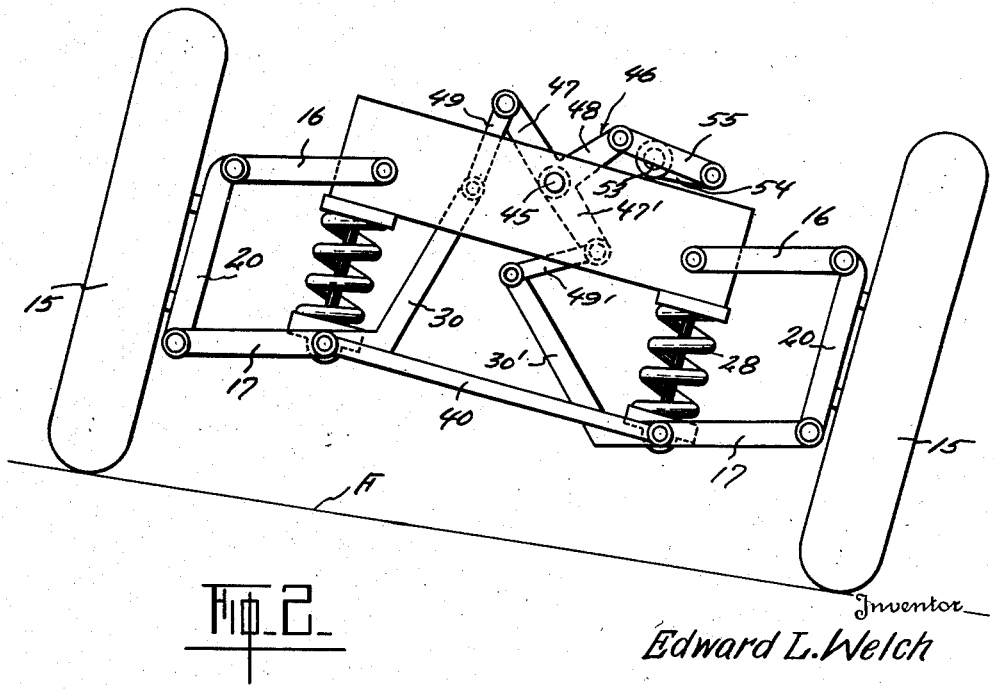

Other objects of the invention will become apparent as the description thereof given hereunder proceeds with reference to the accompanying drawings wherein:

Figure 1 is a front elevational view of a front wheel suspension embodying the vehicle banking mechanism, Figure 2 is a similar view showing the banking mechanism in operation, and Figure 3 is a plan view of the same.

Referring to the drawings, 10 denotes a motor vehicle frame provided with the side members 11 and 12 and a front cross-member which comprises longitudinally spaced transverse members 13 and 14 the ends of which extend laterally beyond the side members 11 and 12, as most clearly shown in Figure 3.

The front wheels 15 are mounted for independent movement on the frame 10 by means of the parallel and normally horizontal arms 16 and 17. Each upper arm 16 which may be of H-formation is pivotally connected at its inner end to the cross-members 13 and 14 by the pivot 18 and at its outer end is pivotally connected as at 19 to the upper end of a vertical wheel carrying bracket 20. The lower arm 17 is pivotally connected at its outer end as at 21 to the lower end of the wheel carrying bracket 20 and is provided at its inner end with a pivot 22. Preferably, but not necessarily, each pivot 22 has a spring seat 23 provided with a central vertical guide rod 24, that slidably extends through a sleeve 25 (Fig. 3) formed on a similar opposed spring seat 26 attached to the underside of the cross-member 12, for supporting a helical coil spring 28 suitably mounted on the seats 23 and 26.

The lower arms 17 are each provided respectively with an extension 30, 30' of equal length which are inclined with respect to each other in an upward and inward relationship to the arms 17 for a purpose to be hereinafter described. The wheel carrying bracket 20 is formed with a yoke 31 which receives the wheel spindle 32 for pivotal movement on the king-pin 33 (Fig. 3) carried by the yoke arms, whereby to permit steering movement of the wheel. A steering knuckle 34 is carried by each wheel spindle 32, both knuckles being connected to a central steering lever 35 by the steering connecting rods 36 and steering links 37. The connecting rods 36 and links 37 are connected together by universal ball and socket joints as at 38; the connection between the links 37 and the steering knuckles being effected by similar ball and socket joints 39, in the manner well known.

To insure proper operation of the members of the suspension as above described it is necessary that the effective length of the arms 16 and 17 and the steering connecting links 37, between their points of pivotal connection be equal, as indicated by "a" and "b", Figure 1, and "c", Figure 3. This will permit the steering members to function properly irrespective of the angular relationship of the arms 16 and 17. Furthermore, the equal length of the arms 16 and 17 will permit the wheels 15 to cant each to the same degree to the left or to the right as required.

Connecting the arms 17, and arranged on each side thereof is a brace rod 40, the ends of which are pivotally attached in any suitable manner to the pivots 22 of said arms; said brace rods 40 acting to hold the arms 17 in their proper relationship relative to the upper arms 16 and the wheel carrying brackets 20.

Arranged in the longitudinal center of the frame 10 and mounted in suitable bearings provided in the cross-members 13 and 14 is a shaft 45 having mounted thereon for rocking movement therewith an equalizing lever 46, which comprises horizontal equal arms 47, 47' and a vertical arm 48. The outer ends of the lever arms 47 are connected by links 49, 49' of equal length, to the free ends of the extensions 30, 30' of the lower suspension arms 17, said links being arranged wholly between the cross-members 13 and 14. In the normal relationship of parts shown in Figure 1, the links 49 are inclined in an inward and downward direction to their points of connection 50, to the ends of the extensions 30, 30'.

Provided on the inner cross-member 14 to one side of the shaft 45 is a bearing 52 in which is mounted a shaft 53, for a purpose to be hereinafter described; the end of said shaft projecting forwardly of said bearing into the plane of the vertical arm 48 of equalizing lever 46. A crank 54 is rigidly mounted on the end of the shaft 53, and is connected to the vertical arm 48 of the equalizing lever 46 by a link 55. The other end of the shaft 53 is connected to a suitable controlled source of power such for example as an electric motor or auxiliary drive to the vehicle engine. Preferably the shaft may be connected through reduction gearing to an electric motor connected up to the vehicle battery and controlled by a suitable switch mounted on the steering column. Such an arrangement is illustrated in Fig. 3 in which an electric motor 65 connected to the vehicle battery through the hand operated reversing switch 66 is mechanically connected to the shaft 53 through the reduction gearing comprising a worm and worm wheel 67.

Referring now to Figure 2, the operation of the mechanism above described is as follows:

The motor vehicle is assumed in Fig. 2 to be making a turn to the left on a flat curve, as for example around a flat corner or on a road where the curve is not banked, said flat curve being indicated by the line F. In order to accommodate all the parts shown in Figure 1, and in the same scale, the line F has been shown inclined, though I desire it to be understood that the relationship of the parts of the vehicle shown in Figure 2 is that for movement of the same on a flat or horizontal surface. When the vehicle traveling at a relatively high speed is approaching such a flat curve to make a left turn and the operator of the vehicle deems the speed such as to make it expedient and desirable to bank the vehicle 15 in negotiating the curve, he will cause the shaft 53 to rotate clockwise (viewing Fig. 2) under the action of the power device (not shown) manually controlled by him. Thus, rotation of the shaft 53 in said clockwise direction will through the link 55 cause the lever 46 to turn about its axis or shaft 45 in a similar direction, which movement will be transmitted by the links 49, 49' to the extensions 30, 30' of the arms 17. The lever arm 47 moving upwardly will through the link 49 pull the extension 30 upwardly to cause the same and the connected arm 17 to move in a counter clock-wise direction about the pivot 22 to thus elevate this side of the frame 10, which when raised will through the upper suspension arm 16 act to cant the wheel at that side to the left as viewed by the driver. In a corresponding manner the other side of the frame is simultaneously lowered by the lever arm 47' moving downwardly and the wheel at that side is similarly canted to the same degree. It is to be understood that when the vehicle is negotiating a turn to the right, that the mechanism always under the control of the operator will be caused to cant the wheels and bank the entire vehicle in a direction opposite to that shown in Figure 2.

Obviously, changes in the details and construction may be made without departing from the spirit of the invention and I desire it understood that I do not limit myself to any particular form or arrangement of parts.

Having thus set forth and disclosed the nature of this invention, what is claimed is:

1. In a front wheel suspension for motor vehicles, opposed wheel carrying brackets, wheels mounted on said brackets for steering movement, a pair of parallel arms pivotally connected to each bracket with at least one arm of each pair pivotally connected to the vehicle frame, a spring element between the frame and the other arm of each pair and having a pivotal mounting on said other arm, combined wheel canting and body tilting means mounted on said frame and operatively connected to each of said other arms adjacent said pivotal mountings carried thereby, and operating means arranged to actuate said wheel canting and body tilting means whereby upon a selected movement of said operating means said wheel canting and body tilting means will rock said other arms about said pivotal mounting to simultaneously cant said wheels and tilt said frame.

2. In a front wheel suspension for motor vehicles, opposed wheel carrying brackets, wheels mounted on said brackets for steering movement, a pair of transverse superposed parallel arms pivotally connected to each bracket, the upper arm of each pair being pivotally connected to the vehicle frame, an equalizing lever pivotally mounted on the frame in the longitudinal center plane thereof, means connecting said equalizing lever with each of the lower arms, and operating means arranged to rock said equalizing lever whereby upon a selected movement of said operating means said equalizing lever and said means will rock said lower arms to simultaneously cant said wheels and tilt said frame.

3. In the front wheel suspension as set forth in claim 2, said means connecting said equalizing lever with each of said lower arms comprising an extension rigid with the inner end of each lower arm and inclined in an upward and inward direction, and links pivotally connecting the ends of the equalizing lever with the free ends of said extensions, said links having an inclination opposite to that of said extensions.

4. In the front wheel suspension as set forth in claim 2, said equalizing lever having a vertical central arm, a longitudinal shaft connected to a source of power, a crank on said shaft in the plane of the vertical arm of said equalizing lever and a link connecting said crank with the vertical arm of said equalizing lever.

5. In the front wheel suspension as set forth in claim 2, brace rods arranged on each side of said lower arms, and pivotally connected thereto.

6. In the front wheel suspension as set forth in claim 2 a spring element between the frame and the lower arm, and a pivotal mounting for said spring element on the lower arm.

7. In a front wheel suspension for motor vehicles, opposed wheel carrying brackets, wheels mounted on said brackets for steering movement, a pair of parallel arms pivotally connected to each bracket with one arm of each pair pivotally connected to the vehicle frame, vehicle banking means mounted on said frame and operatively connected to each of said arms not so connected to said frame, and operating means arranged to actuate said vehicle banking means whereby upon a selected movement of said operating means said vehicle banking means will rock the last mentioned arms in opposite directions about their pivotal mounting on the wheel brackets to simultaneously cant said wheels and tilt said frame all in the same direction.

8. In a front wheel suspension for motor vehicles, opposed wheel carrying brackets, wheels mounted on said brackets for steering movement, a pair of transverse superposed parallel arms pivotally connected to each bracket, the upper arm of each pair being pivotally connected to the vehicle frame, a spring mounted between said frame and each of the lower arms, a pivotal mounting for each of said springs on its respective lower arm, an equalizing lever pivotally mounted on the frame in the longitudinal center plane thereof, means connecting said equalizing lever with each of said lower arms at points adjacent said pivotal mountings, and operating means arranged to rock said equalizing lever whereby upon a selected movement of said operating means said equalizing lever and said means will rock said lower arms about said pivotal mountings to simultaneously cant said wheels and tilt said frame.

EDWARD L. WELCH.